F. H. HAMILTON & T. BULLOCK.
HEMP SCUTCHER.
No. 6,987. Patented Jan. 1, 1850.
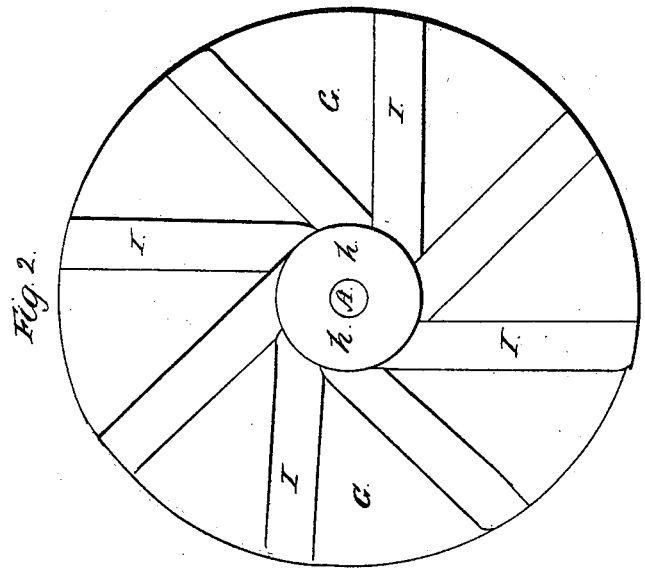
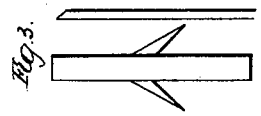
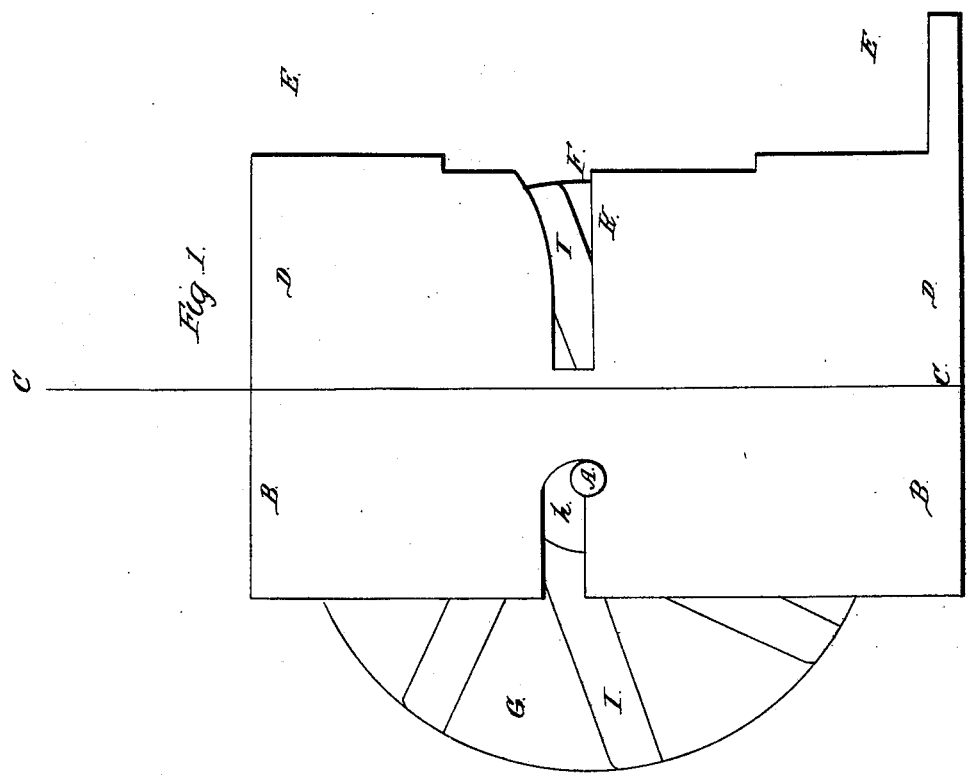

UNITED STATES PATENT OFFICE.

F. H. HAMILTON AND THOMAS BULLOCK, OF SCHENECTADY, NEW YORK.

IMPROVEMENT IN HEMP-SCUTCHERS.

Specification forming part of Letters Patent No. 6,987, dated January 1, 1850.

*To all whom it may concern:*

Be it known that we, F. H. HAMILTON and THOMAS BULLOCK, of the town and county of Schenectady, and State of New York, have invented a new and useful Machine for Dressing or Scutching Flax or Hemp; and we do hereby declare that the following is a full and exact description thereof, reference being had to the accompanying drawings, and to the letters of reference marked thereon.

The nature of our invention consists in making a circular head or back upon a horizontal shaft, upon which head or back we place the knives or scrapers in an angular position, and also tangentially from the hub or circle drawn around the center to the periphery, by which arrangement and combination we obtain the beneficial results hereinafter named and described.

To enable others skilled in the art to make and use our invention, we will proceed to describe its construction and operation.

We place our shaft $a\ a$, Figures 1 and 2, in a room, B B, Fig. 1. The line $c\ c$ is a partition. D D, Fig. 1, is a box or projection into the working-room E E, which box is made tight, except an opening for the insertion of the flax or hemp at F, Fig. 1. We make the circular head or back for flax about five feet in diameter, G G, Figs. 1 and 2, with a hub of twelve or fifteen inches diameter, $h\ h$, Figs. 1 and 2. We place the knives or scrapers I I I, Figs. 1 and 2, on the head or back, with the cutting or scraping edges raised about two inches (more or less) from the back or head, and the edges of the knives are placed in a tangential position from the hub to the periphery. The flax or hemp is held by the hand on the rest $k$, Fig. 1, and the position of the knives or scrapers is such that when they strike the flax at the top of the rest the motion is similar to that of one jaw of a pair of shears, and the knives or scrapers do not cross the flax or hemp at right angles until on a level with the bottom of the hub, thereby tending to spread the flax or hemp toward the periphery instead of drawing it toward the center, as with other machines; but the combined effect of the position of the knives or scrapers with the back or head tends to keep the flax or hemp in a thin sheet, the back keeping it from whipping over the raised edges of the knives or scrapers, while the suction of air under the raised edges of the knives or scrapers tends to keep the flax or hemp in a waving or undulating motion between the back or head and the rest, which gives a scraping instead of a whipping blow to the flax or hemp, as is represented by Fig. 3, which is a section of the scutcher or dresser, showing the end of the knife or scraper with its raised edge and its operation upon the flax or hemp.

The advantages of our machine over others (several of which we have tried) are, first, it spreads the flax or hemp into a thin sheet, thereby giving a large surface to the scrapers; second, the back or head prevents the flax or hemp from whipping over the edge of the knife or scraper, and thereby cutting or snapping it off or pulling it out of the hand; third, the flax or hemp is much easier held in the hand; fourth, the hub prevents the flax or hemp from drawing in around the shaft; fifth, it approximates more nearly to the German mode of dressing or scraping by hand; sixth, a saving of twenty-five per cent. of flax over any other machine we have seen or used.

What we claim as our invention, and desire to secure by Letters Patent, is—

The combination of the circular back or head with the inclined knives or scrapers and the hub and rest, substantially as is herein mentioned.

F. H. HAMILTON.
THOS. BULLOCK.

Witnesses:
   B. V. Y. VEDDER,
   JONATHAN CRANE.